Nov. 10, 1936.                E. F. ROSSMAN                2,060,532
                              SHOCK ABSORBER
                           Filed Feb. 28, 1936

INVENTOR
EDWIN F. ROSSMAN
BY
Spencer, Hardman and Fehr
ATTORNEYS

Patented Nov. 10, 1936

2,060,532

UNITED STATES PATENT OFFICE 2,060,532

SHOCK ABSORBER

Edwin F. Rossman, Dayton, Ohio, assignor to General Motors Corporation, Detroit, Mich., a corporation of Delaware Application February 28, 1936, Serial No. 66,174

5 Claims. (Cl. 188—88)

This invention relates to improvements in hydraulic shock absorbers.

It is among the objects of the present invention to provide a hydraulic shock absorber, capable of offering not only the proper resistance for controlling extensive relative movements between the frame and axle of a vehicle as a result of the operation of the vehicle over a rough highway, but also adapted to provide a minimum resistance while the vehicle is being operated over a moderately rough roadbed.

A further object of the present invention is to provide a hydraulic shock absorber, adapted automatically to adjust itself in accordance with the nature of the roadbed over which the vehicle is being operated.

Such automatic adjustment is attained by the use of an inertia weight which, in response to predetermined accelerations in the movement of the shock absorber in one direction will adjust the shock absorber to provide a greater restriction to fluid flow under these circumstances.

In order to obtain the proper resistance by the shock absorber while the vehicle is being operated over a moderately rough roadbed, it has been found necessary to impede the movements of the inertia mass, for, to permit too free a movement of said mass under these circumstances, permits actuation thereof in response to slight movements of the vehicle body, thus allowing the mass to adjust the shock absorber so that it affords abnormally rigid control and thus forms a substantial tie between the axle and vehicle body through which small bumps, which ordinarily would be cushioned by the vehicle springs, are directly transmitted to the vehicle body, resulting in a harsh and uncomfortable ride.

Further objects and advantages of the present invention will be apparent from the following description, reference being had to the accompanying drawing, wherein a preferred embodiment of the present invention is clearly shown.

The shock absorber shown in the present drawing is constructed like and functions in a similar manner as does the shock absorber illustrated, described and claimed in the Patent 1,995,901 issued to E. F. Rossman et al. March 26, 1935, and for this reason detailed description of its construction and operation apart from the portion relating particularly to this invention will be eliminated.

Figure 1:
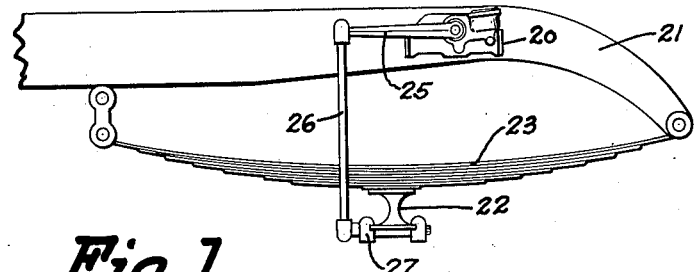
Fig. 1 is a fragmentary side view of the vehicle chassis having a shock absorber equipped with the present invention attached thereto. The roadwheel of the vehicle is omitted for purposes of simplifying the view.

The shock absorber as a whole is designated by the numeral 20. In Fig. 1 this shock absorber 20 is shown attached to the vehicle frame 21, which frame is supported upon the vehicle axle 22 by the springs 23.

A rocker shaft 24 has one end extending outside the shock absorber to which end is attached the shock absorber operating arm 25. The free end of this arm has one end of a link 26 secured thereto, the opposite end of said link being anchored to the axle 22 by a clamping member 27.

Within the shock absorber casing, rocker shaft 24 has an operating cam 30 secured thereto, which engages and is adapted to reciprocate a piston including head portions 31 and 32 secured together by bolts 33, each threadedly engaging one head and slidably extending through another. Each bolt has a spring 34, interposed between its head and the piston through which said bolt slidably extends, said spring urging the piston head it engages into engagement with the operating cam 30. Each piston head portion has a passage 36 providing for the transfer of fluid from one side of the piston to the other, the fluid flow through said passage being controlled by a unitary valve mechanism including an intake valve 37 and a pressure release valve 38. The casing of the shock absorber provides a cylinder 40 in which the piston heads reciprocate, piston head 31 forming the spring compression control displacement chamber 41, while piston head portion 32 forms the spring rebound control displacement chamber 42. The intake valves 37 of the respective piston heads provide for a substantially free flow of fluid from the reservoir portion 43 of the casing into the respective displacement chambers as the piston head portions move away from their respective cylinder heads, while the pressure release valves 38 of the piston provide for a restricted fluid flow from their respective displacement chambers 41 and 42 as the piston heads move to exert a pressure upon the fluid within said chambers. The construction and operation of these portions of the shock absorber are described in the patent aforementioned and, inasmuch as they do not enter into the present invention, it is believed no detailed description thereof need be made here.

The shock absorber casing provides a chamber 50 which communicates with the reservoir 43 through a passage 51. This chamber 50 is connected with the displacement chamber 42 by a passage 52 and a duct 53, the latter being internally threaded to receive the valve standard 54 provided with a longitudinal passage 55, terminating short of its upper end, said passage communicating with transverse passages 56. These transverse passages 56 discharge into the chamber 50. A sleeve valve 57 slidably fits about the valve standard 54 and has a plate 58 secured thereto. This plate carries the inertia mass 59 which is yieldably, resiliently suspended within the chamber 50 by a spring 60 interposed between an abutment plate 61 carried on the valve standard 54 and the plate 58.

Figure 2:
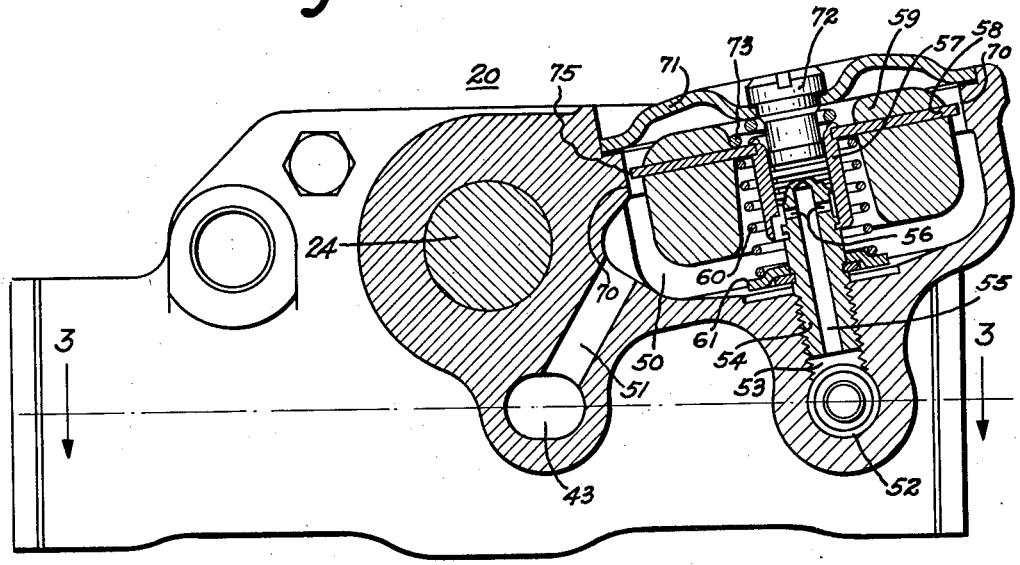
Fig. 2 is a fragmentary sectional view taken from the front of the shock absorber, clearly illustrating the automatic control.

By referring to Fig. 2 it may be seen that the inner wall of chamber 50 has a flange portion 70, forming a cylinder. The plate 58 normally lies within the confines of this cylinder 70 when the inertia mass 59 is maintained in normal position by the spring 60. This plate 58 is circular, the peripheral edge thereof being spaced from the annular wall of the cylinder 70 so as to provide a small orifice 75 between the outer peripheral surface of the plate 58 and the adjacent annular wall of cylinder 70. A plate 71 is secured upon the casing to provide a tight cover for the chamber 50, the head 72 of the valve standard 54 engaging and holding the plate 71 in sealing engagement with the casing. A spring 73 is provided between the cap 71 and the plate 58 and forms a yieldable bumper between the inertia mass and the said cover plate 71.

From the aforegoing it may be seen that plate 58 not only acts as a member for supporting the weight or inertia mass 59 upon the valve 57, but it also provides a piston reciprocable in the cylinder portion 70 of the casing, said piston 58 and cylinder portion 70 forming a dashpot having orifice 75, restriction to the fluid flow through which, as the inertia mass moves downwardly, impeding said movement and thus preventing too free a downward movement of the inertia mass.

Figure 3:
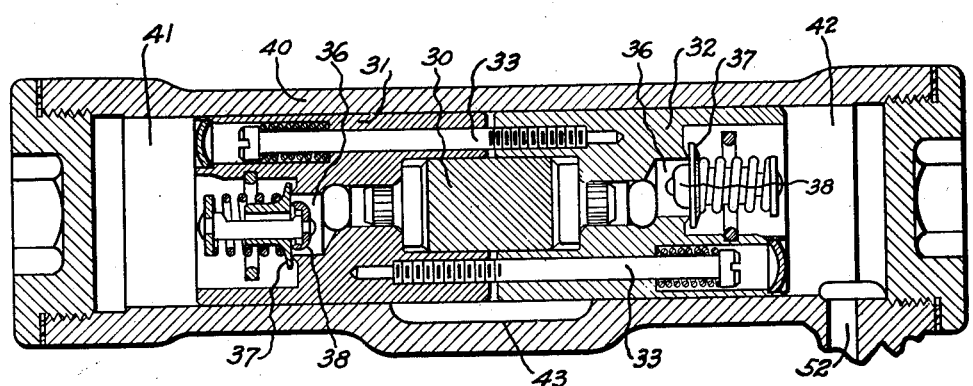
Fig. 3 is a sectional view taken along the line 3—3 of Fig. 2.

In response to the striking of an obstruction by the roadwheel of the vehicle, the axle 22 and spring 23 are thrust upwardly toward the frame 21, compressing the spring 23. Through link 26, arm 25 and cam 30 the piston is moved toward the left as regards Figs. 2 and 3, and consequently a substantially free flow of fluid is permitted into the chamber 42. When the spring 23 rebounds toward its normal load position, a reverse movement of the piston obtains, causing piston head 32 to exert a pressure upon the fluid in chamber 42. Fluid is urged through the passage 52 and through the passage 55 of the valve standard 54 and transverse passages 56 thereof into the chamber 50. Ordinarily fluid flow through this passage 52 is restricted by a static valve, not shown in the present drawing, but described and shown in the Patent 1,995,901. This valve restricting this fluid flow, causes the shock absorber to provide a resistance to this rebounding movement of the spring 23. If the upward thrusts of the axle 22 in response to the striking of obstructions in a moderately rough roadbed is repeated, the frame 21 will be set into motion and if the upward movement of this frame, though small and of short duration, becomes sufficiently accelerated, inertia mass 59 will be moved downwardly relative to the shock absorber casing, thus causing valve 57 to be moved downwardly along the valve standard 54 and shutting off fluid flow from the transverse passages 56. Now the only egress for the fluid flow from chamber 42 is past the heavily loaded pressure relief valve 38. Under these circumstances the shock absorber would provide maximum control and, due to insufficient pressure to move valve 38 from its seat, would form a substantial tie between the axle 22 and frame 21 of the vehicle, and all small bumps met by the roadwheel would be transmitted to the frame 21, resulting in a harsh and uncomfortable ride. Under these circumstances it is desirable not to have the inertia mass function, but to permit the static valve in passage 52 as shown in the Patent 1,995,901 to provide the softer control to fluid flow. To attain this, applicant has so shaped his supporting plate 58 and the casing portion 70 that they cooperate to provide a piston and cylinder forming a dashpot having a small orifice 75 through which the fluid in chamber 50 is urged, as the inertia mass 59 moves downwardly, the restriction to this fluid flow substantially preventing the downward movement of the inertia mass 59. Thus it will be seen that for low accelerations in the movements of the frame 21 upwardly, as the vehicle is being operated over a moderately rough roadbed, the dashpot will become effective to prevent the inertia mass to be actuated to cut off fluid flow from transverse passages 56, thus permitting the shock absorber to offer the proper minimum resistance. However, if the accelerations in the downward movement of the frame reach a predetermined value, then of course the downward movement of the inertia mass 59 will not be sufficiently impeded by the dashpot effect of plate 58 and cylinder 75 to prevent the valve 57 from cutting off the fluid flow through transverse passages 56 and consequently under these circumstances the maximum restriction to fluid flow and therefore the maximum resistance by the shock absorber will be provided.

From the aforegoing description it will be noted that applicant has provided a simple improvement in the form of a plate, which is adapted to act both as an inertia mass supporting member and as a dashpot piston, said dashpot preventing inertia mass operation while the vehicle is being operated over a moderately rough roadbed and a moderate shock absorber control is desired, this dashpot, however, not preventing functioning of the inertia mass in response to a higher rate of acceleration in frame movement and when maximum control is desired.

While the embodiment of the present invention constitutes a preferred form, it is to be understood that other forms might be adopted, all coming within the scope of the claims which follow.

What is claimed is as follows:

1. In a hydraulic shock absorber having a casing providing a cylinder in which a piston forms a displacement chamber, the combination with an outlet duct for said chamber; of a valve for controlling the flow of fluid from said duct; an inertia mass; and means for securing the mass to said valve and cooperating with the casing to provide a dash-pot for impeding movement of said mass.

2. In a hydraulic shock absorber having a casing providing a cylinder in which a piston forms a displacement chamber, the combination with an outlet duct for said chamber; of a valve for controlling the flow of fluid from said duct; an inertia mass; and a plate secured to said valve and having the mass attached thereto, said plate cooperating with the casing to provide a dash-pot for impeding too free action of the mass.

3. In a hydraulic shock absorber having a casing providing a cylinder in which a piston forms a displacement chamber, the combination with an outlet duct for said chamber; of a valve for controlling the flow of fluid from said duct; an inertia mass; means attached to the valve and supporting the mass, said means cooperating with the casing to provide a dash-pot to control movement of the mass; and resilient means supporting the mass normally to maintain the valve in duct open position.

4. In a hydraulic shock absorber having a casing providing a cylinder in which a piston forms a displacement chamber, the combination with an outlet duct for said chamber; of a valve for controlling the flow of fluid from said duct; an inertia mass; a plate secured to the valve and having the inertia mass attached thereto, said plate cooperating with the casing to provide a dash-pot for preventing too rapid movement of the mass; and a spring supporting the plate normally to maintain the valve in duct open position.

5. In a hydraulic shock absorber, the combination with a casing providing a cylinder in which a piston forms a displacement chamber, said chamber having an outlet port, the combination with a conduit secured in said port and having communicating longitudinal and transverse passages; a sleeve-valve slidable on said conduit and adapted to close the transverse passages thereof; an inertia mass; a plate secured to the sleeve-valve and having the inertia mass attached thereto, said plate forming a piston cooperating with the casing to provide a dash-pot for preventing too rapid movement of the inertia mass; and a spring yieldably supporting the plate so as to maintain the sleeve-valve normally to keep the transverse passages open.

EDWIN F. ROSSMAN.